(12) United States Patent
Servantie et al.

(10) Patent No.: US 10,890,309 B1
(45) Date of Patent: Jan. 12, 2021

(54) METHOD OF AIMING A HIGH DEFINITION PIXEL LIGHT MODULE

(71) Applicant: VALEO NORTH AMERICA, INC., Troy, MI (US)

(72) Inventors: Ambroise Servantie, Seymour, IN (US); John Orisich, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/712,608

(22) Filed: Dec. 12, 2019

(51) Int. Cl.
    *B60Q 1/06*     (2006.01)
    *F21S 41/657*     (2018.01)
    *F21S 41/36*     (2018.01)
    *F21S 41/153*     (2018.01)

(52) U.S. Cl.
    CPC ........... *F21S 41/657* (2018.01); *F21S 41/153* (2018.01); *F21S 41/36* (2018.01)

(58) Field of Classification Search
    CPC ......... F21S 41/657; F21S 41/153; F21S 41/36
    USPC ................................ 362/466, 508, 512, 523
    See application file for complete search history.

(56) References Cited

U.S. PATENT DOCUMENTS

| | | | | |
|---|---|---|---|---|
| 10,139,070 | B2 * | 11/2018 | Reitegger | F21S 41/153 |
| 10,151,440 | B2 * | 12/2018 | Woodward | F21S 41/24 |
| 10,180,222 | B2 * | 1/2019 | Tanaka | F21S 41/141 |
| 10,718,483 | B2 * | 7/2020 | Fischer | F21S 41/26 |
| 2014/0226355 | A1 * | 8/2014 | Blandin | F21S 41/151 362/520 |
| 2016/0102831 | A1 * | 4/2016 | Okubo | F21S 41/19 362/512 |
| 2016/0257241 | A1 | 9/2016 | Hofmann | |
| 2019/0143885 | A1 * | 5/2019 | Sugimoto | F21S 41/143 362/466 |

FOREIGN PATENT DOCUMENTS

| | | |
|---|---|---|
| DE | 10 2010 046 517 A1 | 4/2011 |
| DE | 10 2012 110 535 A1 | 5/2014 |
| DE | 10 2013 101 607 A1 | 8/2014 |
| DE | 10 2014 114 845 A1 | 6/2016 |
| DE | 10 2014 117 844 A1 | 6/2016 |
| DE | 10 2018 101 686 B3 | 1/2019 |
| DE | 10 2017 117 594 A1 | 2/2019 |
| EP | 2 128 590 A1 | 12/2009 |
| WO | WO 2012/048795 A1 | 4/2012 |

\* cited by examiner

*Primary Examiner* — Ali Alavi
(74) *Attorney, Agent, or Firm* — Valeo North America, Inc.

(57) ABSTRACT

A method of aiming a light module for a vehicle, the method including projecting at least one projected shape from a high definition pixel light source onto a receiving area of an aimer; determining the center point or edges of the high definition pixel light source based on the at least one projected shape; and adjusting the orientation of the light module to align the high definition pixel light source in a desired orientation.

20 Claims, 4 Drawing Sheets

METHOD OF AIMING A HIGH DEFINITION PIXEL LIGHT MODULE

FIELD OF THE INVENTION

The present invention generally pertains to the adjustment of the orientation (namely the aiming direction) of the beams emitted by headlights, notably headlights for motor vehicles. The present invention more particularly concerns an improved method for aiming vehicle headlights which include high definition pixel light sources such as monolithic LED arrays, DMD's, HD projectors, or the like.

BACKGROUND

In conventional methods for aiming a motor vehicle light module several drawbacks or disadvantages exist. Manufacturing tolerances between light modules and light sources create variations between each light module to be aimed, thus requiring an initial step of calibrating the light module to be within aiming tolerances.

Further, conventional methods of aiming vehicle light modules rely on a final beam pattern including a cutoff line and hot spots to be projected from the light module. However, color variations occur at the cutoff line of beam patterns which cause difficulty in determining the precise location of the cutoff line by the aiming tool. Further, determining the center of a hot spot of a beam pattern, whether manual or through software, is an imprecise process that may negatively affect the final aim of the light module.

SUMMARY OF THE INVENTION

A method of aiming a light module for a vehicle is described herein.

In one exemplary aspect, a method of aiming a light module includes projecting at least one projected shape from a high definition pixel light source onto a receiving area of an aimer; determining the center point or edges of the high definition pixel light source based on the at least one projected shape; and adjusting the orientation of the light module to align the high definition pixel light source in a desired orientation.

In one exemplary aspect, the high definition pixel light source is a monolithic chip that includes an array of light emitting diodes (LEDs) that can be individually controlled, and the at least one projected shape corresponds to a shape of a plurality of LEDs of the array of LEDs emitting light to form the at least one projected shape.

In one exemplary aspect, the high definition pixel light source is a Digital Micromirror Device.

In one exemplary aspect, the at least one projected shape includes a pattern, and an angular offset or tilt of the light module is calculated based on the pattern.

In one exemplary aspect, the pattern is a checkerboard pattern, an alternating line pattern, or a pattern of dots.

In one exemplary aspect, the at least one projected shape is chosen based on the requirements of the aimer.

In one exemplary aspect, a center of the at least one projected shape corresponds with a center of the high definition pixel light source.

In one exemplary aspect, the method further includes calculating a positional offset of the high definition pixel light source based on a projected position of a center of the at least one projected shape compared to a desired position of the center of the at least one projected shape.

In one exemplary aspect, adjusting the orientation of the light module is based on the calculated positional offset of high definition pixel light source.

In one exemplary aspect, the method further includes calculating an angular offset of the high definition pixel light source based on an orientation of a pattern of the at least one projected shape compared to a desired angular orientation of the pattern of the at least one projected shape.

In one exemplary aspect, adjusting the orientation of the light module is based on the calculated angular offset of high definition pixel light source.

In one exemplary aspect, the pattern is a checkerboard pattern, an alternating line pattern, or a pattern of dots.

In one exemplary aspect, the at least one projected shape includes at least two projected shapes.

In one exemplary aspect, an angular offset or tilt of the light module is calculated based on the position of the at least two projected shapes relative to each other.

In one exemplary aspect, the at least two projected shapes are different shapes.

In one exemplary aspect, the at least one projected shape is a polygonal shape.

In one exemplary aspect, the at least one projected shape is a cross or a circle.

In one exemplary aspect, an angular offset or tilt of the light module is calculated based on a position or orientation of the projected shape.

In one exemplary aspect, adjusting the orientation of the light module is automatically performed by an automatic screw driver that receives a calculated adjustment from the aimer.

In one exemplary aspect, the at least one projected shape includes a first portion that has a dimmer light intensity than a second portion of the at least one projected shape.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
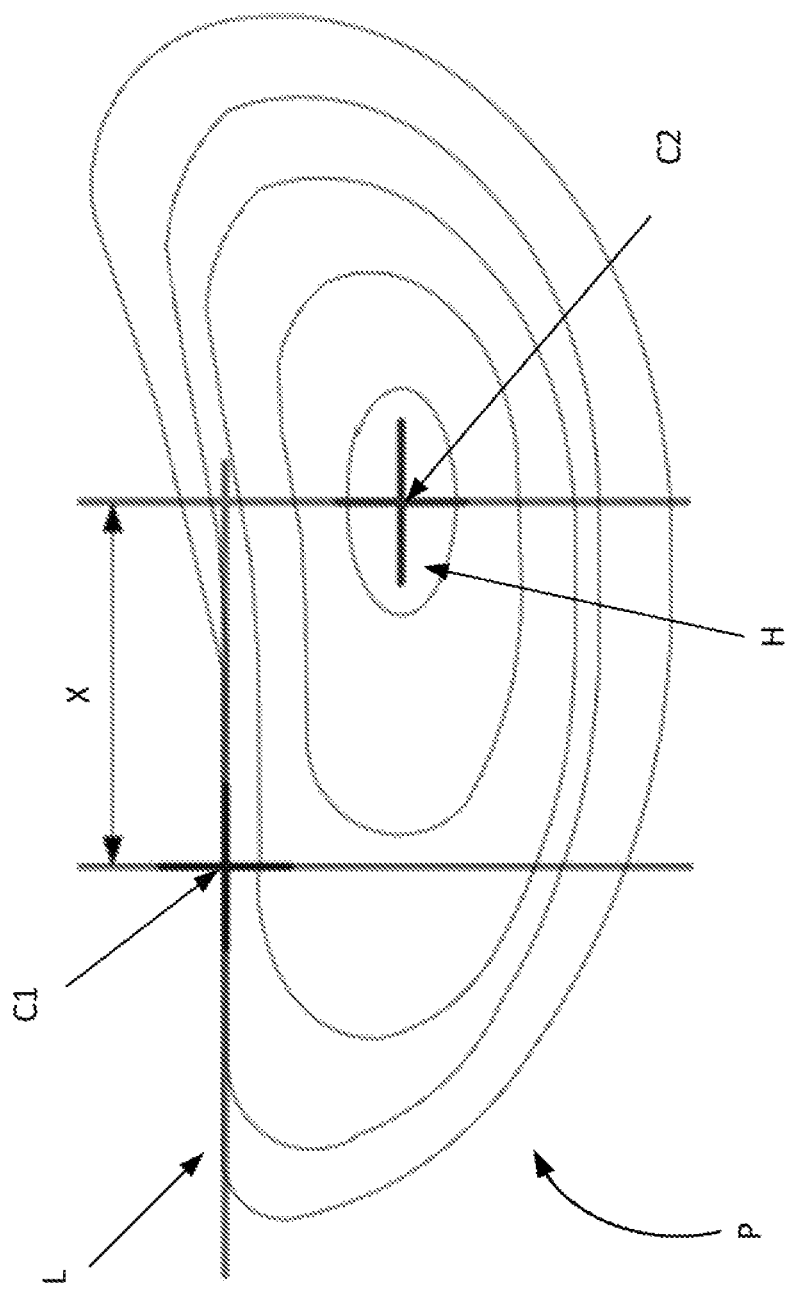
FIG. 1 is an illustration of a conventional beam pattern used in a conventional light module aiming process.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word "exemplary" is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Referring now to the drawings, wherein like reference numerals designate identical or corresponding parts throughout the several views.

FIG. 1 illustrates a conventional beam pattern P used in a conventional method for aiming a vehicle light module. The beam pattern P is an example of a beam pattern that is typically used in vehicles designed for the European market and typically designed to meet SAE standards. The beam pattern P is projected onto a receiving area of an aiming tool ("Aimer"). The Aimer is a device commonly used in the process of aiming a vehicle light module.

As seen in FIG. 1 the beam pattern includes a cutoff line L and a hot spot H. The cross markers C1 and C2 indicate the desired location (C1) of the hot spot H and the current location (C2), respectively. In the conventional aiming process, an offset X between the current hot spot location C2 and the desired hot spot location C1 is calculated by the Aimer or other software. However, the location of the hot spot is calculated based on evaluating the intensity of light at various points in the beam pattern. Because of manufacturing variations in the conventional light sources, light module lenses, mounting brackets, etc. the location, size, shape, or intensity of each hot spot of each light module may vary. Thus, the calculated offset, which depends on the accuracy of pinpointing the center of the hot spot H, between each light module and may result in variations between the final aiming of each light module. Additionally, the cutoff line L, which must be positioned to meet regulatory requirements, can be difficult to detect because of color variations located at or close to the cutoff line. In particular, beam patterns often include blue light variations at or just above the cutoff line which can cause errors in determining the precise location of the cutoff line. Further, cutoff lines for headlamps for use in U.S. markets are typically less sharp compared to headlamps for use in European markets. This difference in cutoff line sharpness, particularly with the less sharp headlamps for use in the U.S., reduces the Aimer's ability to accurately locate and position the cutoff line.

In contrast to the conventional aiming process, the present invention substantially eliminates the negative effects of manufacturing variations between light modules.

Figure 2:
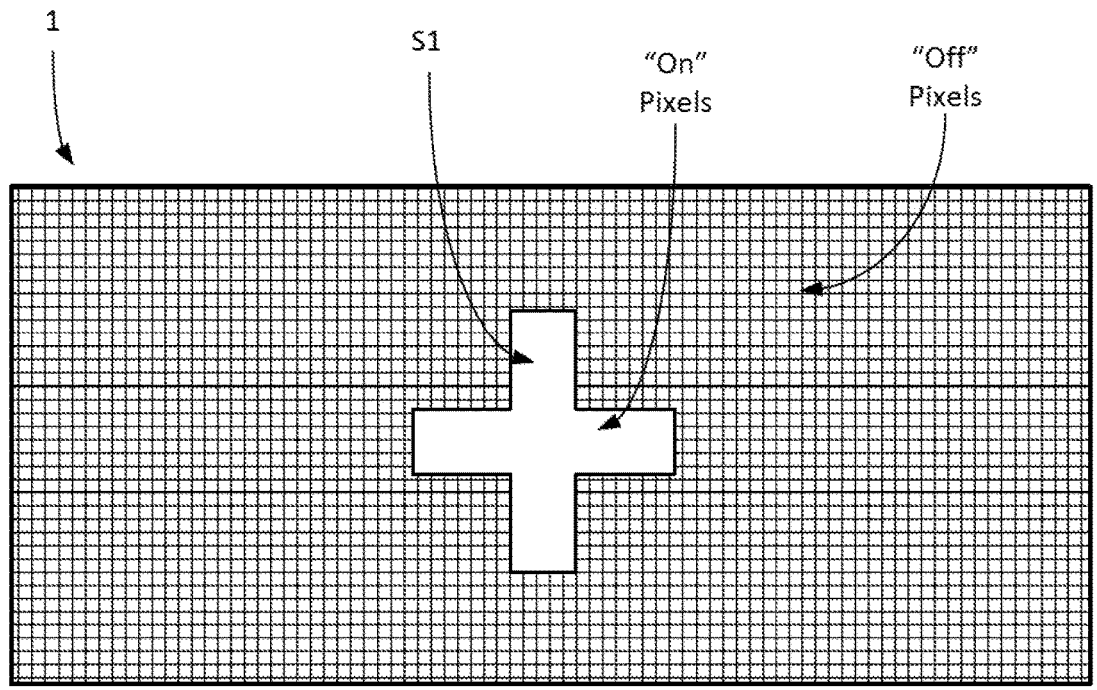
FIG. 2 is an illustration of a high definition pixel light source with one polygonal shape projected therefrom, according to exemplary aspects of the disclosure.

FIG. 2 illustrates a high definition ("HD") pixel light source 1 with shapes projected therefrom, according to exemplary aspects of the disclosure. In one exemplary aspect, the HD pixel light source may be a monolithic LED array light source, a Digital Micromirror Device ("DMD") light source, a High Definition Projector light source, or the like. Each HD pixel light sources are capable of projecting various shapes by individually controlling the on/off status of each pixel. For example, in a monolithic LED array light source an array of LEDs are arranged on a monolithic chip and each LED corresponds to a pixel of the projected light beam. In addition to control of the on/off status of each pixel, the HD pixel light sources may also be capable of dimming each projected pixel to create complex beam patterns and shapes.

In the exemplary HD pixel light source of FIG. 2, the shape S1 is projected from the HD pixel light source 1 toward the receiving area of an associated Aimer. In FIG. 2 the grid area represents an array of pixels of the HD pixel light source 1. That is, each box of the grid schematically represents a single pixel. The shape S1 is projected by controlling the individual pixels to be in an "on" or "off" status such that pixels in the "on" status together form the projected shape S1. In one exemplary aspect, the shape S1 is a cross and is a single solid color. However, in other exemplary aspects, the shape S1 can be any shape that is suitable for use with the chosen Aimer. That is, each Aimer may require a specific shape or pattern to be projected onto the receiving area of the Aimer. Because the high definition pixel light sources are capable of individually controlling each pixel, the projected shape S1 can be chosen at the time of aiming the light module in order to meet the requirements of the Aimer used in the aiming process. Thus, the aiming process of the present disclosure can be easily adapted to meet the requirements of the Aimer chosen to be used in the aiming process. In one exemplary aspect, the center of the shape S1 corresponds to the center of the high definition pixel light source. Thus, when the center of the shape S1 is adjusted to be in a desired position (e.g. aimed to be within regulatory requirements) the entire light source 1 will also be adjusted to be in the desired position. Accordingly, the manufacturing variations between each module are substantially rendered moot because the projected shape S1 allows the center of the HD pixel light source to be properly aimed, regardless of manufacturing variations in the orientation of the HD pixel light source within the light module. In other exemplary aspects, the center of the shape S1 does not correspond to the center of the HD pixel light source. In this configuration, the Aimer may be configured to calculate the center of the HD pixel light source based on the position of the shape S1. In other exemplary aspects, the shape S1 may be used to determine the edges of the HD pixel light source. In other exemplary embodiments, a selected location or point, aside from the center or edges of the HD pixel light source, may be used in aiming the light module and the Aimer may be configured to calculate needed adjustments based on the selected location or point.

Figure 3:
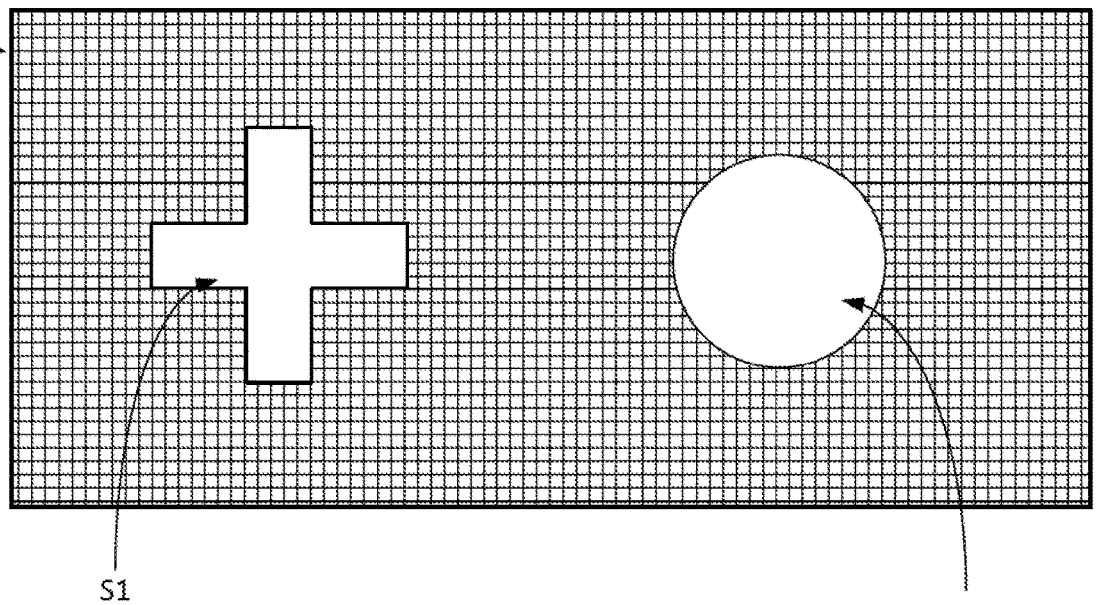
FIG. 3 is an illustration of a high definition pixel light source with two shapes projected therefrom, according to exemplary aspects of the disclosure.

FIG. 3 illustrates a HD pixel light source 2 with the shapes S1 and S2 projected therefrom, according exemplary aspects of the disclosure. Similar to FIG. 2, the grid in FIG. 3 represents an array of pixels, with each box of the grid schematically representing one pixel. In one exemplary aspect, shape S1 is a cross and shape S2 is a circle. The shapes S1 and S2 are projected by controlling the individual pixels to be in an "on" or "off" status such that pixels in the "on" status form the projected shapes S1, S2. Although the shape S2 is depicted as a circle with a smooth, round edge in FIG. 3, it is clear that, in reality, the projected circle shape S2 will include an edge that is "pixelated" (i.e. not perfectly rounded). As seen in FIG. 3, the shapes S1 and S2 are vertically aligned in the center of the HD pixel light source 1, but spaced apart from the horizontal center of the HD pixel light source. In one exemplary aspect, by projecting two shapes S1 and S2, an angular offset or tilt of the light module can be calculated. That is, because the shapes S1 and S2 are vertically aligned with respect to the HD pixel light source 1, if the shapes S1 and S2 are not vertically aligned when projected onto the Aimer, an angular offset or tilt of the light module can be calculated and corrected. As noted above, the specific polygonal shapes of S1 and S2 can be chosen based on several factors including, but not limited to, the requirements of the chosen Aimer.

Figure 4:
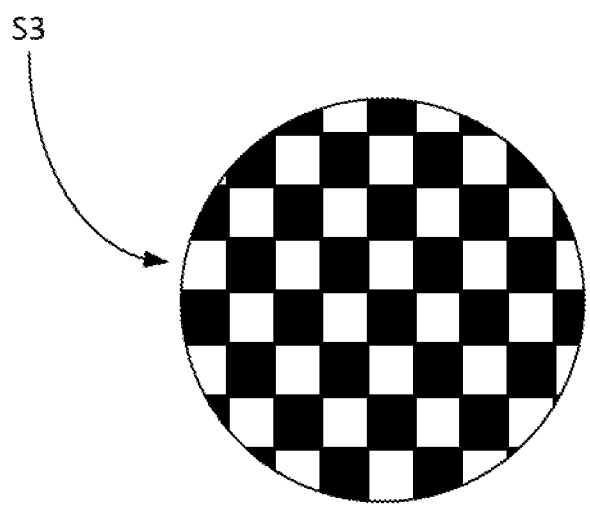
FIG. 4 is an illustration of a first projected shape with a first pattern, according to exemplary aspects of the disclosure.

FIG. 4 illustrates a projected shape S3 that includes a pattern, in accordance with exemplary aspects of the disclosure. As discussed above, the HD pixel light sources are capable of not only controlling on/off status of each pixel, but are also capable of dimming each pixel as desired. Thus, in one exemplary aspect, the HD pixel light source 1 is capable of projecting a shape S3 that is in the shape of a cross and includes a checkerboard pattern, as shown in FIG. 4. In this pattern, white boxes correspond to pixels that are "on" or projecting light and black boxes correspond to pixels that are "off" or not projecting light. Alternatively, the white boxes may be pixels that are "on" and the black boxes may be pixels that are projecting a dimmer light than the "on" pixels. In either case, the Aimer may be capable of detecting whether a given pixel is on, off, or dimmed by any amount. Thus, the Aimer is capable of detecting the checkerboard pattern within the projected shape S3. By projecting a checkerboard pattern the angular offset or tilt of the light module can be calculated through projection of a single shape S3. Of course, other patterns can be used in the shape S3, depending upon the requirements or capabilities of the Aimer used with the aiming process. For example, the projected pattern may be cross-hatching, a pattern of dots, alternating lines, or the like.

Figure 5:
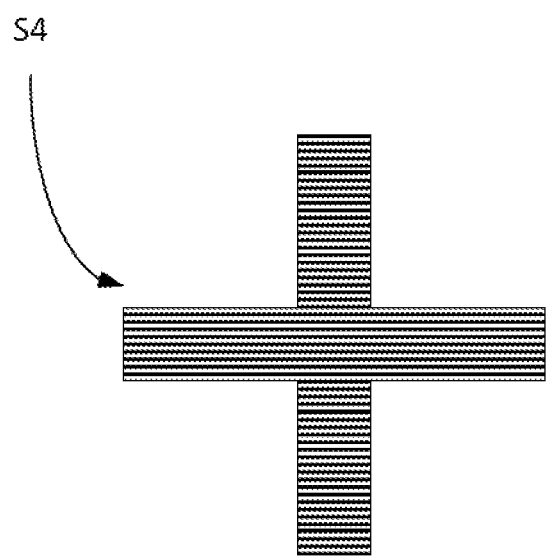
FIG. 5 is an illustration of a second projected shape with a second pattern, according to exemplary aspects of the disclosure.

FIG. 5 illustrates shows an additional projected shape S4 in accordance with exemplary of the disclosure. As illustrated in FIG. 5, the projected shape S4 is in the shape of a cross and includes an alternating line pattern. In the pattern shown in FIG. 5, white lines correspond to pixels that are "on" or projecting light and black lines correspond to pixels that are "off" or not projecting light. Similar to the checkerboard pattern described in regard to FIG. 4 above, the alternating line pattern can be used to calculate an angular offset or tilt of the light module by evaluating orientation of the lines in the alternating line pattern. As described above, the shape S4 may be used to calculate a positional offset as well as an angular offset or tilt of the HD pixel light source.

Figure 6:
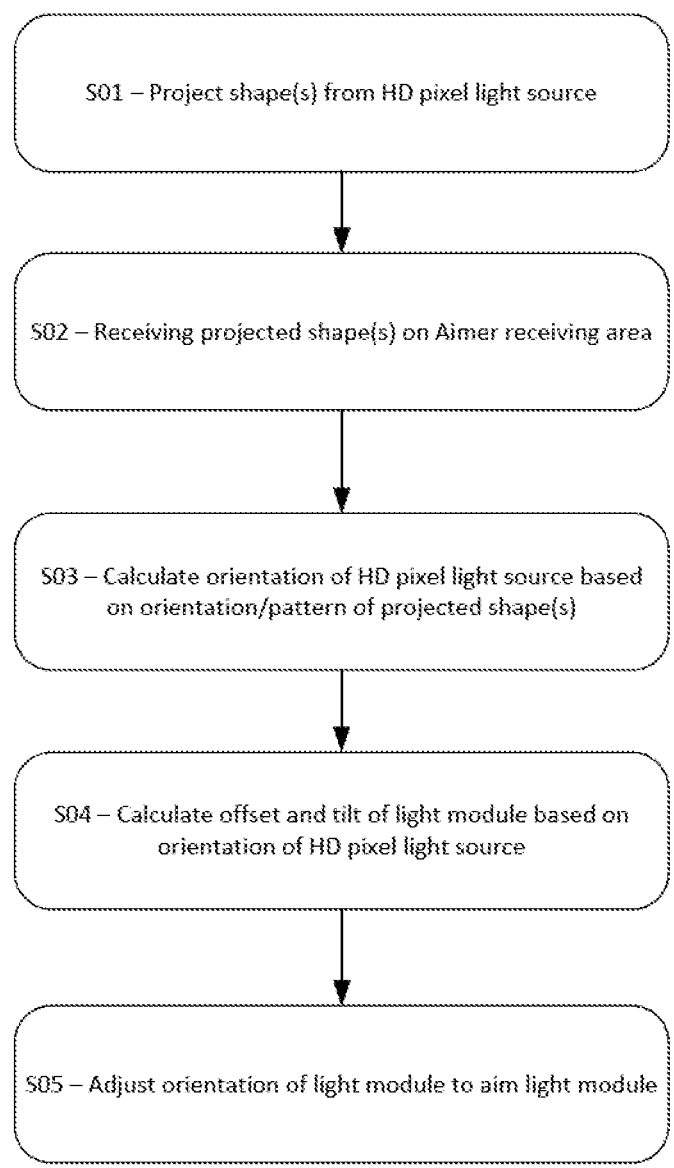
FIG. 6 is a block diagram of a method of aiming a high definition pixel light source, according to exemplary aspects of the disclosure.

FIG. 6 is a block diagram of a method of aiming an HD pixel light module, according to exemplary aspects of the disclosure. In step S01, shapes (e.g. shapes S1, S2, S3, S4, etc.) may be projected from an HD pixel light source (e.g. a monolithic LED array, a DMD, a HD Projector, etc.). In step S02, the projected shapes may be received on a receiving area of an Aimer. The receiving area of the Aimer may be a front transparent end of a light tunnel of the Aimer. The Aimer may include sensors that are used to detect the shape and intensity of the projected light within the light tunnel. In step S03, an orientation of the HD pixel light source may be calculated based on the orientation of the projected shape(s) and/or patterns within the projected shape(s). As discussed, above the orientation of HD pixel light source may be determined based on the center points, edges, patterns, or other selected point(s) of the projected shape(s). In step S04, the positional and angular offsets of the HD pixel light source from the desired orientation may be calculated. The desired orientation may be selected based on factors including, but not limited to, regional regulations, lighting efficiency, and/or safety considerations. In step S05, the orientation of the light module may be adjusted in order to align the orientation of the HD pixel light source with the desired orientation such that the light module is properly aimed. Adjusting the light module can be done either manually or automatically. In one exemplary aspect, an automatic screw driver is attached to an adjustment screw of the light module and the Aimer controls the automatic screw driver to adjust the light module as needed. In other exemplary aspects, the adjustment screw of the light module is manually adjusted by a technician or the automatic screw driver is controlled by the technician to adjust the light module.

As discussed above, the disclosed method of aiming an HD pixel light module presents numerous advantages over the conventional aiming methods. In particular, the disclosed method may substantially eliminate the need to account or adjust for manufacturing variations between each light module because the projected shapes are created by individual pixels of the HD pixel light sources. Further, the disclosed method significantly reduces the time needed for aiming each light module; therefore, manufacturing costs and total manufacturing time can be advantageously reduced.

As used herein, the words "a" "an", and the like include a meaning of "one or more", unless stated otherwise. The drawings are generally drawn not to scale unless specified otherwise or illustrating schematic structures or flowcharts.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

The invention claimed is:

1. A method of aiming a light module for a vehicle, the method comprising:
   projecting at least one projected shape from a high definition pixel light source onto a receiving area of an aimer;
   determining the center point or edges of the high definition pixel light source based on the at least one projected shape; and
   adjusting the orientation of the light module to align the high definition pixel light source in a desired orientation.

2. The method of aiming a light module for a vehicle according to claim 1, wherein the high definition pixel light source is a monolithic chip that includes an array of light emitting diodes (LEDs) that can be individually controlled, and
   the at least one projected shape corresponds to a shape of a plurality of LEDs of the array of LEDs emitting light to form the at least one projected shape.

3. The method of aiming a light module for a vehicle according to claim 1, wherein the high definition pixel light source is a Digital Micromirror Device.

4. The method of aiming a light module for a vehicle according to claim 1, wherein the at least one projected shape includes a pattern, and an angular offset or tilt of the light module is calculated based on the pattern.

5. The method of aiming a light module for a vehicle according to claim 4, wherein the pattern is a checkerboard pattern, an alternating line pattern, or a pattern of dots.

6. The method of aiming a light module for a vehicle according to claim 1, wherein the at least one projected shape is chosen based on the requirements of the aimer.

7. The method of aiming a light module for a vehicle according to claim 1, wherein a center of the at least one projected shape corresponds with a center of the high definition pixel light source.

8. The method of aiming a light module for a vehicle according to claim 1, the method further comprising calculating a positional offset of the high definition pixel light source based on a projected position of a center of the at least one projected shape compared to a desired position of the center of the at least one projected shape.

9. The method of aiming a light module for a vehicle according to claim 8, wherein adjusting the orientation of the light module is based on the calculated positional offset of high definition pixel light source.

10. The method of aiming a light module for a vehicle according to claim 1, the method further comprising calculating an angular offset of the high definition pixel light source based on an orientation of a pattern of the at least one projected shape compared to a desired angular orientation of the pattern of the at least one projected shape.

11. The method of aiming a light module for a vehicle according to claim 10, wherein adjusting the orientation of the light module is based on the calculated angular offset of high definition pixel light source.

12. The method of aiming a light module for a vehicle according to claim 10, wherein the pattern is a checkerboard pattern, an alternating line pattern, or a pattern of dots.

13. The method of aiming a light module for a vehicle according to claim 1, wherein the at least one projected shape includes at least two projected shapes.

14. The method of aiming a light module for a vehicle according to claim 13, wherein an angular offset or tilt of the light module is calculated based on the position of the at least two projected shapes relative to each other.

15. The method of aiming a light module for a vehicle according to claim 13, wherein the at least two projected shapes are different shapes.

16. The method of aiming a light module for a vehicle according to claim 1, wherein the at least one projected shape is a polygonal shape.

17. The method of aiming a light module for a vehicle according to claim 1, wherein the at least one projected shape is a cross or a circle.

18. The method of aiming a light module for a vehicle according to claim 1, wherein an angular offset or tilt of the light module is calculated based on a position or orientation of the projected shape.

19. The method of aiming a light module for a vehicle according to claim 1, wherein adjusting the orientation of the light module is automatically performed by an automatic screw driver that receives a calculated adjustment from the aimer.

20. The method of aiming a light module for a vehicle according to claim 1, wherein the at least one projected shape includes a first portion that has a dimmer light intensity than a second portion of the at least one projected shape.

* * * * *